United States Patent [19]

Rattlingourd et al.

[11] 4,164,022
[45] Aug. 7, 1979

[54] ELECTRONIC DIGITAL ARCTANGENT COMPUTATIONAL APPARATUS

[75] Inventors: Glen D. Rattlingourd, Salt Lake City; John W. Zscheile, Jr., Murray, both of Utah

[73] Assignee: Sperry Rand Corporation, New York, N.Y.

[21] Appl. No.: 903,278

[22] Filed: May 5, 1978

[51] Int. Cl.$^2$ ............................................. G06F 15/34
[52] U.S. Cl. .................................................. 364/729
[58] Field of Search ....................................... 364/729

[56] References Cited

U.S. PATENT DOCUMENTS

| 3,956,623 | 5/1976 | Clark et al. | 364/729 |
| 4,077,063 | 2/1978 | Lind | 364/729 |

Primary Examiner—David H. Malzahn
Attorney, Agent, or Firm—John P. Dority; William E. Cleaver; Marshall M. Truex

[57] ABSTRACT

Electronic digital apparatus for computing an approximation of the arctangent of a given tangent number, N, being in the range of 0 to 1 and in binary form, operates in two stages to provide a solution of the expression:

$$\text{Arctan}(N) = \text{Arctan}(C_k) + \frac{N - C_k}{1 + C_k(N)}.$$

During the first stage, steps are taken by the apparatus to find out where within the range of 0 to 1, divided preferably into four equal increments, the known tangent number N is located. When the correct increment represented by one of a plurality of increment numbers $I_j$ stored in a ROM unit of the apparatus is found, then one of a like plurality of center numbers $C_k$ of that increment also stored in the ROM unit may be readily selected, as can also be the corresponding one of a plurality of stored numbers $A_i$ representing the arctangents of the stored center numbers $C_k$. During the first stage, the product number $C_k(N)$ is also formed. In the second stage of operation of the apparatus, the dividend and divisor numbers $N - C_k$ and $1 + C_k(N)$ are first calculated. The quotient number, $$(N - C_k)/[1 + C_k(N)],$$

is then calculated. Finally, the Arctan $(C_k)$, such being the selected one of the arctangent numbers $A_i$, is accessed from the ROM unit and added to the quotient which gives, as an approximation, the value of the unknown angle.

5 Claims, 7 Drawing Figures

| FUNCTION TABLE FOR ALU 30 | | | |
|---|---|---|---|
| CONTROL | | | OPERATIONS ON INPUTS |
| $C_3$ | $C_2$ | $C_1$ | |
| 0 | 0 | 0 | A+0 |
| 0 | 0 | 1 | B+1 |
| 0 | 1 | 0 | A+B |
| 1 | 1 | 0 | A−B |
| 1 | 1 | 1 | 0−A |

FIG. 3

| FUNCTION TABLE FOR DIGITAL SHIFTER 32 | | | OPERATIONS ON INPUTS | OUTPUT ENABLED |
|---|---|---|---|---|
| CNTRL | | | | |
| $C_3$ | $C_2$ | $C_1$ | | |
| 0 | 0 | 0 | NO SHIFT | $S_0$ |
| 0 | 0 | 1 | SHIFTED ONE PLACE TO RIGHT | $S_1$ |
| 0 | 1 | 0 | SHIFTED TWO PLACES TO RIGHT | $S_2$ |
| 0 | 1 | 1 | SHIFTED THREE PLACES TO RIGHT | $S_3$ |
| 1 | 0 | 1 | SHIFT ONE PLACE TO LEFT | $S_4$ |

FIG. 2

| SELECTION CODE FOR ROM UNIT 24 | | | | | CONSTANTS STORED IN ROM IN BINARY FORM |
|---|---|---|---|---|---|
| CONTROL INPUTS | | COUNTER INPUTS | | | |
| $C_2$ | $C_1$ | $CO_2$ | $CO_1$ | | |
| 1 | 1 | 1 | 1 | A OUTPUT ENABLED | $A_4\ A_3\ A_2\ A_1$ |
| 1 | 1 | 1 | 0 | | .718... |
| 1 | 1 | 0 | 1 | | .558... |
| 1 | 1 | 0 | 0 | | .358... |
| 1 | 1 | | | | .124... |
| 0 | 0 | 1 | 1 | C OUTPUT ENABLED | $C_4\ C_3\ C_2\ C_1$ |
| 0 | 0 | 1 | 0 | | .875 |
| 0 | 0 | 0 | 1 | | .625 |
| 0 | 0 | 0 | 0 | | .375 |
| | | | | | .125 |
| 0 | 0 | 1 | 1 | I OUTPUT ENABLED | $I_4\ I_3\ I_2\ I_1$ |
| 0 | 0 | 1 | 0 | | 1.00 |
| 0 | 0 | 0 | 1 | | .75 |
| 0 | 0 | 0 | 0 | | .50 |
| | | | | | .25 |

| NUMBER OF ARCTAN CONSTANTS STORED=$2^n$ | | WORD SIZE M (NO. OF BITS) | | | | | | | | | | | | | | | | | |
|---|---|---|---|---|---|---|---|---|---|---|---|---|---|---|---|---|---|---|---|
| $n$ | $2^n$ | 8 | 9 | 10 | 11 | 12 | 13 | 14 | 15 | 16 | 17 | 18 | 19 | 20 | 21 | 22 | 23 | 24 | 32 |
| 1 | 2 | 1 | 1 | 1 | 1 | 3 | 3 | 3 | 3 | 3 | 5 | 5 | 5 | 5 | 5 | 7 | 7 | 7 | 11 |
| 2 | 4 | 1 | 1 | 1 | 1 | 1 | 1 | 1 | 3 | 3 | 3 | 3 | 3 | 3 | 3 | 5 | 5 | 5 | 7 |
| 3 | 8 | 1 | 1 | 1 | 1 | 1 | 1 | 1 | 1 | 1 | 1 | 3 | 3 | 3 | 3 | 3 | 3 | 3 | 5 |
| 4 | 16 | 1 | 1 | 1 | 1 | 1 | 1 | 1 | 1 | 1 | 1 | 1 | 1 | 3 | 3 | 3 | 3 | 3 | 5 |
| | | | | | | | | | | | | | | | | | | | HIGHEST POWER OF Z COMPONENTS |

ELECTRONIC DIGITAL ARCTANGENT COMPUTATIONAL APPARATUS

BACKGROUND OF THE INVENTION

1. Field of the Invention

The present invention relates generally to the computation of the arctangent of a number and, more particularly, is concerned with a unique combination of electronic digital hardware for implementing a novel technique for solving the arctangent of a number in a simple and fast manner.

2. Description of the Prior Art

In many technical applications, examples of which are navigation and radar positioning, the rectangular coordinates of the position of an object in relation to a reference position and the tangent of the angle defined by the coordinates relative to a reference plane and the reference position can be readily obtained. However, difficulty is encountered in being able to quickly find the angle itself, i.e., computing the arctangent of the tangent of the angle.

One method which has been employed in the past is the Cordic trigonometric computing technique, an understanding of which may be gained by reference to the following articles:

1. "The Cordic Trigonometric Computing Technique," J. E. Volder, *IRE Transactions on Electronic Computers*, Vol EC-8, No. 3, pp. 330–334, September 1959.
2. "A Unified Algorithm for Elementary Functions," J. S. Walther, *Spring Joint Computer Conference*, pp. 379–385, 1971.

Although the Cordic technique by utilizing electronic digital technology has fostered the rapid solution of arctangent computations, it has considerable drawbacks in view of its complexity and cost, and the amount of time taken to reach the solution.

SUMMARY OF THE INVENTION

The technique employed by the apparatus of the present invention provides an alternate approach to solving the arctangent of a number which is simpler, less costly and quicker than the prior art Cordic technique. The arctangent solution is advantageously achieved at greater speed, utilizing fewer computational steps and smaller memory capacity, through an electronic digital hardware implementation formed by a unique combination of commercially-available electronic components.

While the present invention makes use of a mathematical identity, $$\text{Arctan}(X + Y) = \text{Arctan}(X) + \text{Arctan}\left(\frac{Y}{1 + XY + X^2}\right),$$

known in the prior art, it introduces a heretofore unknown technique which is implemented by a unique combination of electronic digital hardware being dedicated to specifically carry it out. Underlying the present invention is the discovery that a simple and fast computation of the arctangent of a known tangent number, in binary form and located in the range of 0 to 1, is facilitated by storing as constants in the hardware: (1) a first plurality of tangent numbers, $I_1, I_2, I_j \ldots I_{2n}$, each representing one of a plurality of $2^n$ equal increments in the range of 0 to 1; (2) a second plurality of tangent numbers, $C_1, C_2, C_k \ldots C_{2n}$, each representing the center value of a corresponding one of the $2^n$ equal increments; and (3) a third plurality of numbers, $A_1, A_2, A_i \ldots A_{2n}$, each representing the arctangent of one of the second plurality of $2^n$ center numbers $C_k$, where $n = 1, 2, 3, 4 \ldots$ From practical experience, it has been determined that a generally useful approximation of the Arctan $(X + Y)$ can be obtained by finding the values of the components, $$\text{Arctan}(X) \text{ and } \frac{Y}{1 + X(Y + X)},$$

and then adding them together. The above components relate to the known tangent number and to the constants stored in the hardware as follows:

$$X = C_k, \tag{1}$$
$$Y = N - C_k, \text{ since } N = X + Y, \tag{2}$$
$$\text{Arctan}(X) = \text{Arctan}(C_k) = A_i, \text{ and} \tag{3}$$
$$\frac{Y}{1 + X(Y + X)} = \frac{N - C_k}{1 + C_k(N)}. \tag{4}$$

Therefore, an approximation of the Arctan (N) is provided by selecting the correct respective ones of the stored constants $C_k$ and $A_i$ for a particular given tangent number N, solving the component, $$(N - C_k)/[1 + C_k(N)],$$

and then adding it to the selected arctangent number $A_i$.

An exemplary implementation of the electronic digital hardware comprising the present invention involves the use of a read-only-memory (ROM) unit. The ROM unit stores, in binary form, the above-mentioned increment numbers, $I_j$; center numbers, $C_k$; and arctangent numbers, $A_i$. The hardware implementation operates in two stages. During the first stage, steps are taken by the hardware to find out where within the range of 0 to 1, divided preferably into four equal increments, the known tangent number N of the unknown angle is located. When the correct increment represented by the number, $I_j$, stored in the ROM unit is found, then the center number $C_k$ of that increment also stored in the ROM unit may be readily selected, as can also be the corresponding stored arctangent number $A_i$. During the first stage, the product number $C_k(N)$ is also formed. In the second stage of operation, the dividend and divisor numbers $N - C_k$ and $1 + C_k(N)$ are first calculated. The quotient number, $$(N - C_k)/[1 + C_k(N)],$$

is then calculated. Finally, the Arctangent $(C_k)$, such being the selected one of the arctangent numbers $A_i$, is accessed from the ROM unit and added to the quotient which gives, as an approximation, the value of the unknown angle. Preferably, the stored constants, known tangent number N and, thereby, its arctangent approximation are in radians.

Accordingly the present invention is directed to electronic digital apparatus for computing the arctangent of a given tangent number, N, being in the range of 0 to 1 and in binary form, the apparatus comprising: (1) first electronic digital means storing in binary form a first plurality ($2^n$) of tangent numbers, $I_1, I_2, I_j \ldots I_{2n}$, each representing one of a plurality ($2^n$) of equal increments in the range of 0 to 1, storing in binary form a second plurality ($2^n$) of tangent numbers, $C_1, C_2, C_k \ldots C_{2^n}$, each representing the center of a corresponding one of said increments, and storing in binary form a third plurality ($2^n$) of numbers, $A_1, A_2, A_i \ldots A_{2^n}$, each representing the arctangent of one of said second plurality of center numbers, $C_k$, where $n = 1, 2, 3 \ldots$; (2) second electronic digital means for receiving and storing in binary form the number N; (3) third electronic digital means for receiving the number N from said second means and for successively receiving said increment numbers $I_j$ from said first means and comparing the same with said number N to determine in which one of said plurality of equal increments said number N is located; (4) fourth electronic digital means for receiving the number N and successively forming a product number, $C_k(N)$, for each number corresponding to the increment number $I_j$ being compared to N; (5) fifth electronic digital means for receiving and storing in binary form the product number $C_k(N)$; (6) said third means, after said comparison determines in which one of said plurality of equal increments the number N is located, for receiving said center number $C_k$ of the one of said increments in which said number N is located and for receiving again said number N to form a dividend number, $N-C_k$, from said received numbers; (7) said second means for then receiving said dividend number $N-C_k$ and storing the same in place of the number N; (8) said third means, after forming said dividend number, then for receiving said product number $C_k(N)$ from said fifth means and adding one thereto to form a divisor number, $1+C_k(N)$, said third means also for receiving said dividend number $N-C_k$ from said second means to form a quotient number, $$(N-C_k)/[1+C_k(N)],$$

from said divisor and dividend numbers; (9) sixth electronic digital means for receiving said quotient number from said third means and storing the same in binary form; and (10) said third means thereafter for receiving the number, $A_i$, from said first means which represents the arctangent of said one of said plurality of center numbers $C_k$ used in forming the quotient number and for receiving said quotient number from said sixth means to form the sum thereof, $$A_i+(N-C_k)/[1+C_k(N)]$$

which approximately equals the arctangent of the known tangent number N.

DETAILED DESCRIPTION OF THE INVENTION

THEORETICAL BASIS FOR THE TECHNIQUE

The apparatus of the present invention implements a unique technique for computing the arctangent of a given tangent number which involves the use of the known mathematical relationship, $$\text{Arctan}(X+Y) = \text{Arctan}(X) + \text{Arctan}\left(\frac{Y}{1+XY+X^2}\right). \quad (1)$$

This relationship is disclosed on page viii of a book entitled *Table of Arctan X*, issued Feb. 18, 1953, by the National Bureau of Standards.

To use the above-stated relationship (1), let the known tangent number, N, equal $X+Y$. Therefore, $$\text{Arctan}(N) = \text{Arctan}(X+Y)$$

and, using the power series expansion for the arctangent, the above relationship (1) can be equated to:

$$\text{Arctan}(N) = \text{Arctan}(X) + Z - \frac{Z^3}{3} + \frac{Z^5}{5} - \frac{Z^7}{7} + \ldots, \quad (2)$$

$$\text{where } Z = \frac{Y}{1+XY+X^2}.$$

By limiting N to within the range of from 0 to 1, Z will be less than 1 and the series converges and may be truncated after the component, $$Z^{K-2}/(K-2),$$

of the relationship (2), with the resulting error being:

$$Z^K/K.$$

Underlying the technique implemented by the apparatus of the present invention is the discovery that a simple and fast computation of the arctangent of a known tangent number, in binary form and located in the range of 0 to 1, can be facilitated by storing arctangent values, in binary form, of the center points of a plurality of $2^n$ equal increments, from 0 to 1, as constants in the memory of the apparatus for use during the computational process. Further, it has been discovered that the number of bits in the word to be used by the apparatus in carrying out the computation as well as the value of n, which determines the number of stored arctangent constants, will determine how many of the Z components of the relationship (2) must be solved to give an accurate approximation of the Arctan (N) with an error less than the LSB.

The number of stored constants will be as follows:

$$\text{Arctan}\left(\frac{1}{2^{n+1}}\right), \text{Arctan}\left(\frac{3}{2^{n+1}}\right), \ldots \text{Arctan}\left(\frac{2^{n+1}-1}{2^{n+1}}\right).$$

Thus, where $n=2$, meaning that four arctangent constants will be stored, they are as follows:

$$\text{Arctan}(X) = \left\{ \text{Arctan}\left(\frac{1}{8}\right), \text{Arctan}\left(\frac{3}{8}\right), \text{Arctan}\left(\frac{5}{8}\right), \text{Arctan}\left(\frac{7}{8}\right) \right\}$$

It was mentioned above that the power series portion of the relationship (2) converges and may be truncated after the component, $$Z^{K-2}/(K-2),$$

resulting in an error of $$Z^k/K.$$

The error is maximum when Y is maximum and X is minimum, that is, when $$Y = 1/2^{n+1} \text{ and } X = 1/2^{n+1}.$$

Thus, $$\text{Error}_{max} = \frac{\left[\dfrac{\frac{1}{2^{n+1}}}{1 + 2\left(\frac{1}{2^{n+1}}\right)^2}\right]^K}{K} = \frac{1}{K(2^{n+1} + 2^{-n})^K}$$

The minimum error is zero. Therefore, the error is within the following range:

$$0 \leq \text{Error} \leq \frac{1}{K(2^{n+1} + 2^{-n})^K}.$$

The error can be shifted by $\frac{1}{2}$, the maximum error resulting in a range of error as follows:

$$\frac{-1}{2K(2^{n+1} + 2^{-n})^K} \leq \text{Error} \leq \frac{1}{2K(2^{n+1} + 2^{-n})^K}$$

Assuming that the apparatus uses a word having M number of bits, three of the bits being used to determine quadrant and half-quadrant, then the resolution of the least significant bit (LSB) is:

$$\frac{\frac{\pi}{4}}{2^{M-3}} \text{ or } \frac{\pi}{2^{M-1}}.$$

So for the relationship (2) to be accurate to the LSB of the apparatus, the following inequality must hold:

$$\frac{\pi}{2^{M-1}} \geq \frac{1}{2K(2^{n+1} + 2^{-n})^K} \text{ or}$$

$$K(2^{n+1} + 2^{-n})^K \geq \frac{2^{M-1}}{\pi}.$$

As an example, assume that the apparatus uses a 24-bit word and that $n=2$, i.e., four constants are stored. Then, $$K(8.25)^K \geq \frac{2^{23}}{\pi} \text{ or } 1.34 \times 10^6.$$

Thus, K must be $\geq 7$ and the amount of the power series required is:

$$Z - (Z^3/3) + (Z^5/5).$$

If eight constants (where $n=3$) are stored, then $$K(16.125)^K \geq 1.34 \times 10^6.$$

Then, K must be $\geq 5$ and the amount of the power series required is:

$$Z - Z^3/3.$$

Figure 5:
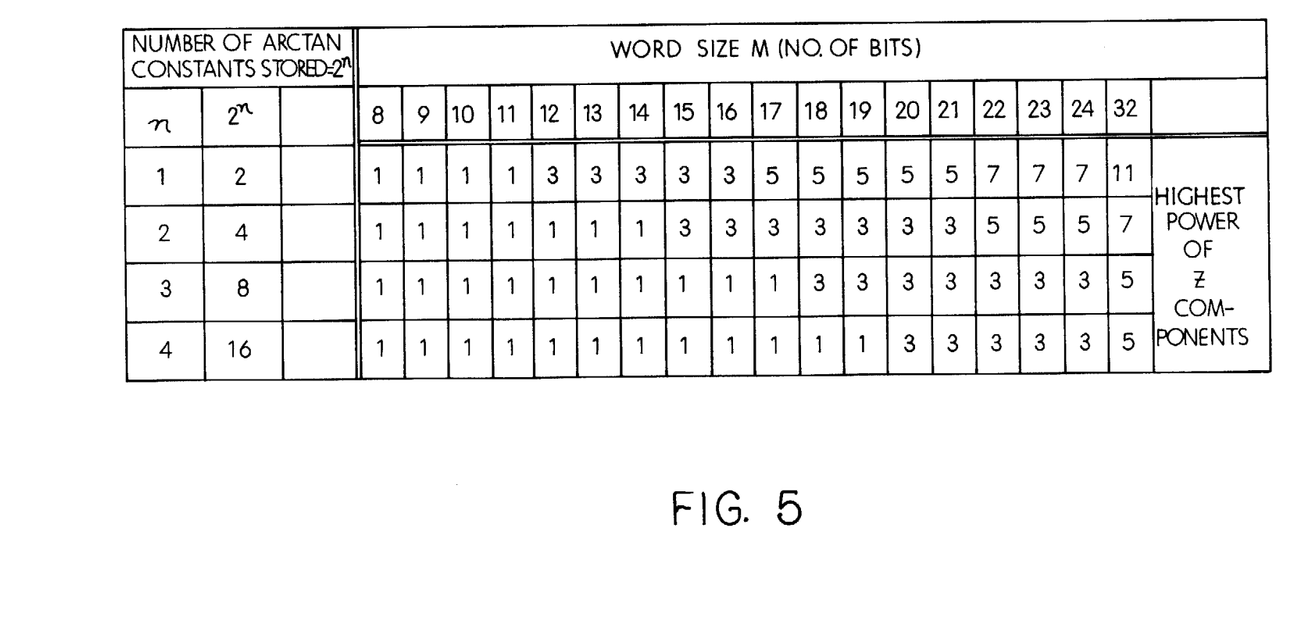
FIG. 5 is a table which sets forth certain relationships discovered in connection with the origination of the technique implemented by the hardware of FIG. 1.

The table of FIG. 5 sets forth the highest power of the Z components required to be used in the composition as a function of the apparatus word size M and the number of constants, $2^n$, stored.

In the preferred form of the electronic digital hardware implementation, described in detail hereinafter, it is assumed that the apparatus word size M being used is sixteen bits in length and that the number of arctangent numbers stored is four (where $n=2$). From FIG. 5, it can be seen that the highest power of the Z components of the relationship (2) that should be used in the computation is three. However, due to typical machine error extension, it has been found that in most cases using only the Z component having a power of one is adequate. Therefore, only the component, Z, needs to be solved.

IMPLEMENTATION OF THE TECHNIQUE

Figure 1:
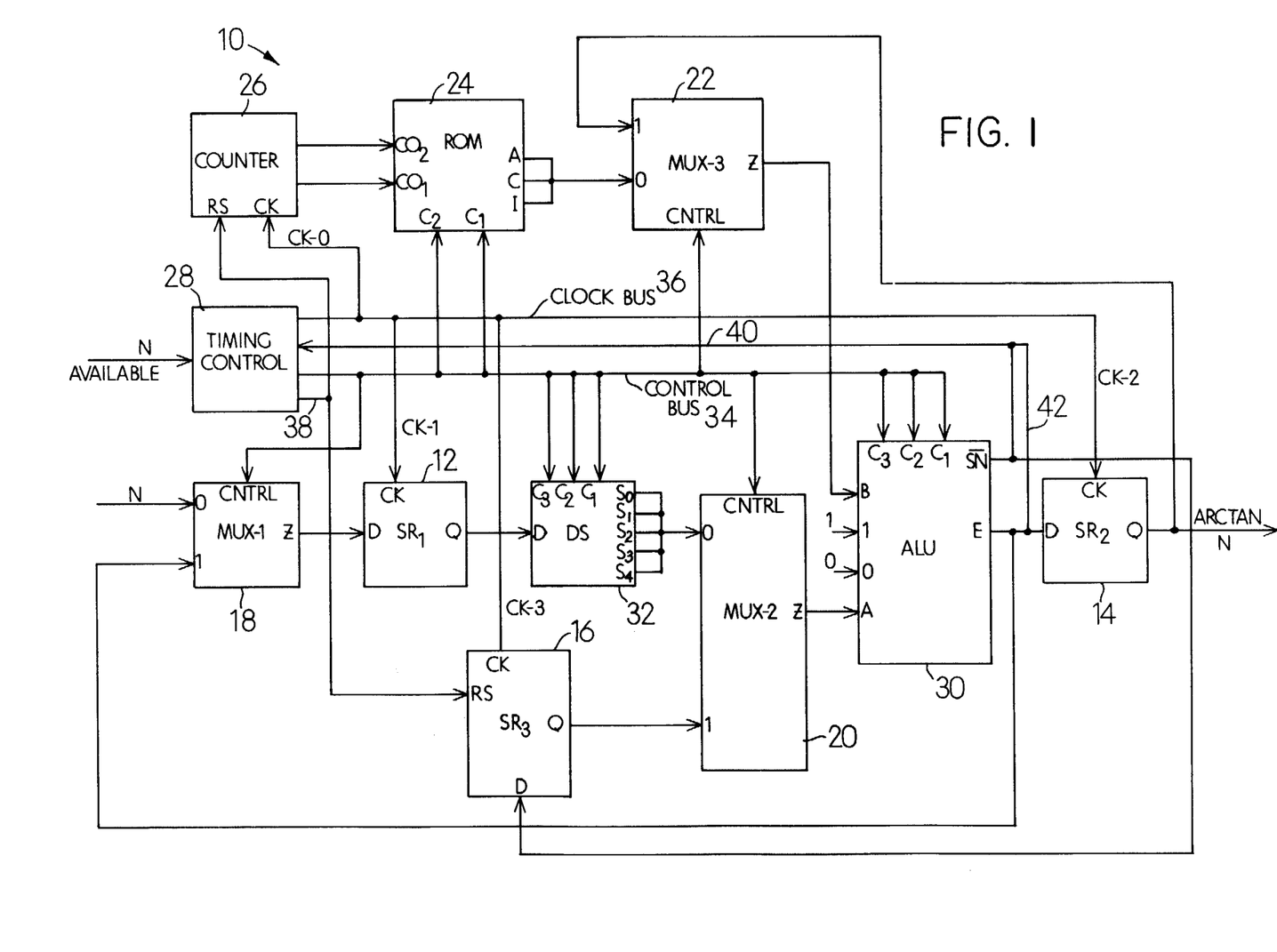
FIG. 1 is a block diagram illustrating the preferred embodiment of the electronic digital arctangent computational hardware of the present invention.

Referring now to FIG. 1 of the drawings, there is shown a preferred electronic digital hardware implementation, generally designated 10, for performing arctangent computation in accordance with the technique employed by the apparatus of the present invention. The components of the implementation 10 are represented in block form since they are individually well known in the art, and to reproduce them in detail would only serve to add to the complexity of the explanation of the present invention without adding to its clarity.

Figure 6:
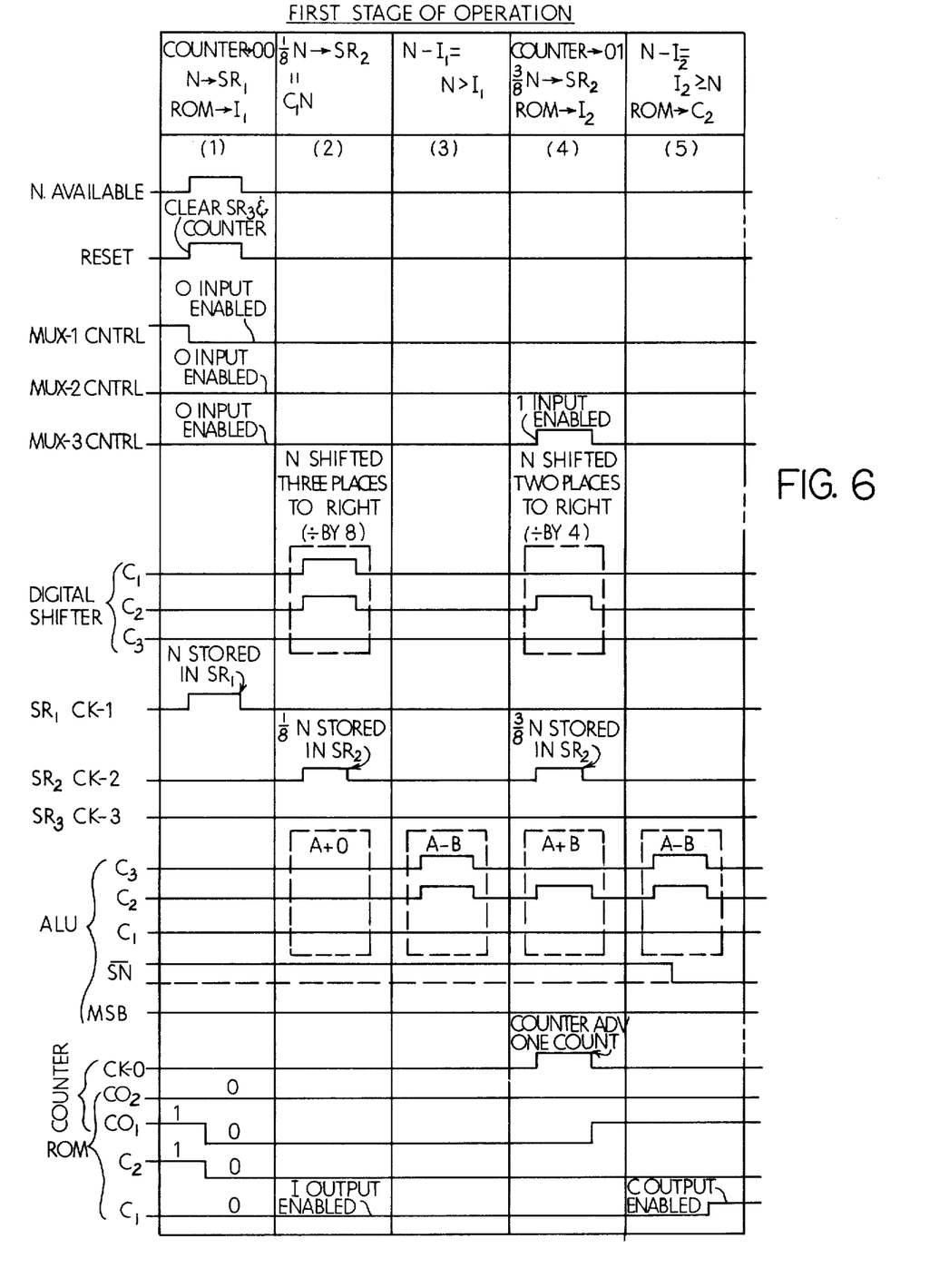
FIGS. 6 and 7 are timing diagrams depicting the relationships between pulses and signal levels produced during the respective first and second stages of operation of the hardware of FIG. 1.
Figure 7:
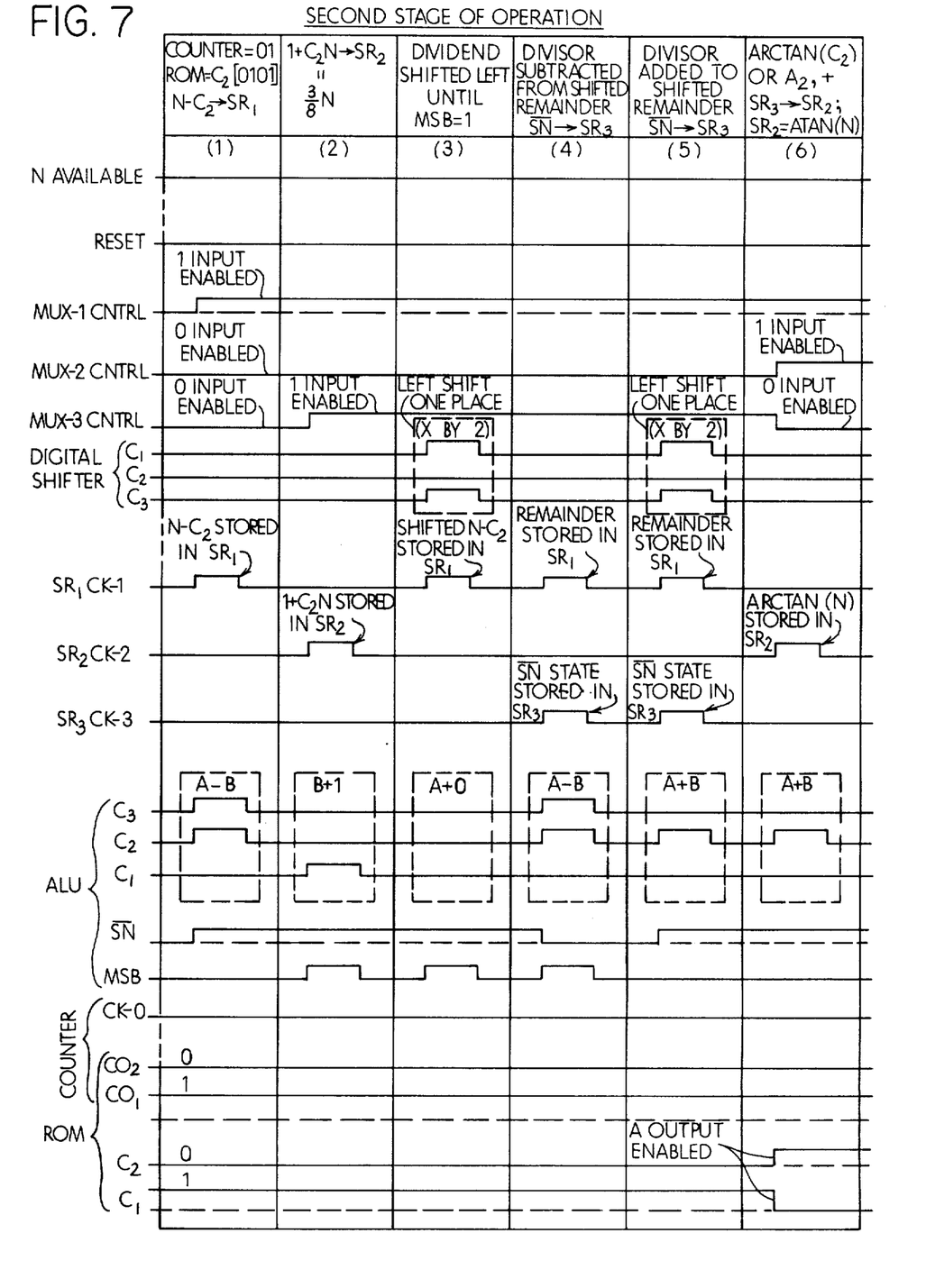

The implementation 10 is comprised by first, second and third shift registers 12, 14 and 16; first, second and third multiplexers 18, 20 and 22; a read-only-memory unit 24; a counter 26; a timing control unit 28; an arithmetic logic unit 30; and a digital shifter 32. In FIGS. 1, 6 and 7, the first, second and third shift registers and multiplexers are abbreviated respectively as $SR_1$, $SR_2$, $SR_3$ and MUX-1, MUX-2, MUX-3. The read-only-memory unit is abbreviated as ROM unit, the arithmetic logic unit as ALU, and the digital shifter as DS.

As seen in FIG. 1, the timing control 28 is connected to respective individual control inputs ($C_3$, $C_2$, $C_1$ or CNTRL) of the multiplexers 18, 20, 22; the ROM unit 24; the ALU 30 and the digital shifter 32 via a control bus 34. Also, the timing control 28 is connected to respective individual clock inputs (CK) of the shift registers 12, 14, 16 and the counter 26 via a clock bus 36. The shift registers 12 and 14 and the digital shifter 32 are composed respectively by a plurality of registers and shifters, with each of the D inputs and Q outputs of the shift registers and the D input and S outputs of the shifter, as well as the lead lines interconnecting the same, representing a corresponding number, such as sixteen, of respective inputs, outputs and leads for receiving, outputting and transmitting signal levels defining the bits of the various binary numbers in parallel fashion. Likewise, the 0 and 1 inputs and Z outputs of the multiplexers 18, 20, 22; the A, B, 0 and 1 inputs and E output of the ALU 30; and the A, C, and I outputs of the ROM unit 24, as well as the lead lines interconnecting the same, are each comprised of multiple or parallel inputs, outputs and leads, such as sixteen, for receiving, outputting and transmitting signal levels defining the bits of the various binary numbers in parallel fashion. The third register 16 has a single D input for receiving data in serial fashion, but its Q output and lead line to the 1 input of the second multiplexer 20 are respectively comprised of multiple outputs and leads, such as sixteen, for outputting and transmitting signal levels defining the bits of various binary numbers in parallel fashion.

Figure 2:
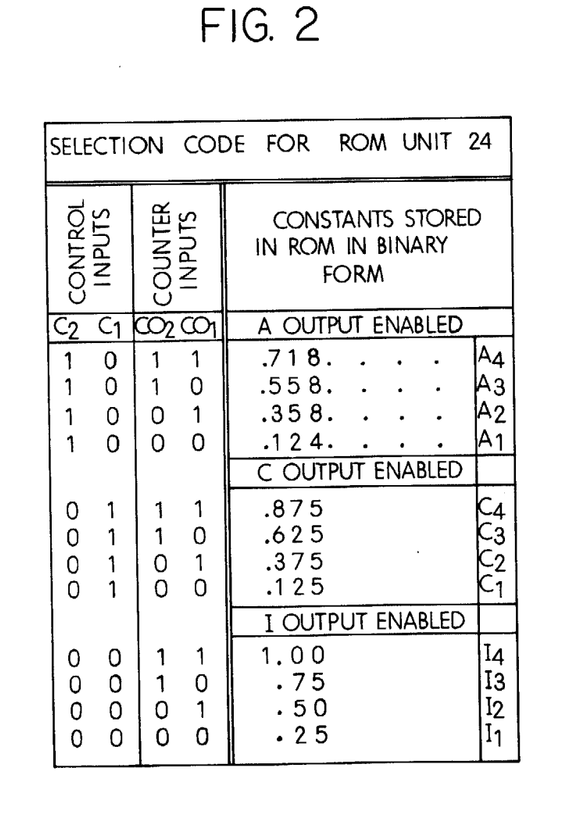
FIG. 2 is a table which sets forth the code stored in the ROM unit of the hardware illustrated in FIG. 1.

As seen in the table set forth in FIG. 2, the ROM unit 24 stores a first plurality ($2^n$) of tangent numbers, $I_j$, falling within the range of 0 to 1, each representing one of a plurality ($2^n$) of equal increments from 0 to 1. In the preferred embodiment where $n=2$, the range is thus divided into four equal parts with the four incremental tangent numbers $I_1$, $I_2$, $I_3$ and $I_4$ being respectively equal to 0.25, 0.50, 0.75 and 1.00. Also, the ROM unit 24 stores a second plurality ($2^n$) of tangent numbers, $C_k$, which each represent the center of a corresponding one of the above increments. Thus, the center numbers $C_1$, $C_2$, $C_3$ and $C_4$ are respectively 0.125 or $\frac{1}{8}$, 0.375 or $\frac{3}{8}$, 0.625 or $\frac{5}{8}$ and 0.875 or $\frac{7}{8}$. Further, the ROM unit 24 stores a third plurality ($2^n$) of numbers, $A_i$, which each represent the arctangent of one of the second plurality of center numbers $C_k$. Therefore, in the preferred embodiment, the four arctangent numbers $A_1$, $A_2$, $A_3$ and $A_4$ are respectively equal to 0.124 . . . , 0.358 . . . , 0.558 . . . and 0.718 . . . , with the least significant digits of these numbers being omitted. All of the above-described stored numbers or constants are in radian units and, while decimal numbers are illustrated, they are stored in binary form.

FIRST STATE OF OPERATION

The operation of the preferred implementation of FIG. 1 will now be described in connection with the timing diagrams of FIGS. 6 and 7 and with reference occasionally being made to FIGS. 2 through 4 when appropriate. During the first stage, being represented in FIG. 6, steps are taken to find out in which one of the four equal increments of the range 0 to 1 the known tangent number N of the unknown angle is located. When the correct increment is found, then the X value of the mathematical relationship (2) can be readily selected for use in the second stage of operation. Also, later, toward the end of the second stage, the correct Arctan (X) value can be readily accessed from the ROM unit 24 for use in the final addition operation with the fractional part of the relationship (2). Further, along with finding the correct one of the values of X, the value of the product X(N) is found which will be used in the computation of the fractional component of the mathematical relationship during the second stage of operation. During the latter stage, being represented in FIG. 7, the values of Y and $1+X(N)$, which are respectively the same as $N-X$ and $1+X(X+Y)$, are first calculated from N, X and X(N) and, finally the division, $$Y/[1+X(X+Y)],$$

is carried out, with the quotient being added to Arctan (X) which gives, as the solution, the approximate value in radians of the unknown angle whose tangent is the known or given number N.

The timing diagrams of FIGS. 6 and 7 illustrate the two stages of operation of the implementation 10 in an exemplary case where the given tangent number N is equal to or greater than increment number $I_1$ (or 0.25), but is less than increment number $I_2$ (or 0.50). However, from the description of the operation of the implementation in this specific case, it will be readily understood how the implementation would function to compute the arctangent of any tangent number falling within the range of 0 to 1.

Referring now to FIG. 1 and column (1) of FIG. 6, the first stage of operation of the implementation 10 commences when a known tangent number N, represented in binary form, arrives at the 0 input of the first multiplexer 18. Simultaneously, a N AVAILABLE signal is received by timing control 28, indicating to the control 28 that the number N is available for computation of its arctangent value and to begin the first stage of operation of the implementation 10. The N AVAILABLE signal thus enables operation of the timing control 28 which first generates a high RESET pulse on lead line 38 and places a low signal level on the control inputs of the three multiplexers 18, 20 and 22; the ROM unit 24; the ALU 30 and the digital shifter 32. The high RESET pulse received at the RS input of the third shift register 16 replaces its contents with zeros. Also, the high RESET pulse received at the RS input of the counter 26 initializes it to a count of zero. With the low signal level being felt at the CNTRL input of the first multiplexer 18, its 0 input is enabled and the number N is passed through it to the D input of the first shift register 12. Simultaneously with generation of the high RESET pulse, the timing control 28 generates a high clock pulse, CK-1, which is received at the CK input of the first shift register 12. On the negative-going edge or transition of CK-1 pulse, the number N is clocked from the D input to and stored on the Q output of the first register 12.

After receipt of the high RESET pulse by the counter 26, the signal levels on the $CO_2$ and $CO_1$ count inputs to the ROM unit 24 from the counter 26 are now both low, reflecting the count of binary zero (00) on the counter output. Also, the $C_2$ and $C_1$ control inputs to the ROM unit 24 from the timing control 28 are both low. Referring to FIG. 2, it is seen that with its control inputs both being low (00), the ROM unit 24 has its I output enabled. Additionally, with the count inputs of the ROM unit 24 both low (00), the stored incremental number $I_1$ (0.25) is selected and placed on its I output. Thus, the ROM input code 0000 selects incremental number $I_1$. The number $I_1$ is felt at the enabled 0 input of the third multiplexer 22 and passed through to the B input of the ALU 30 in preparation for comparison with the tangent number N by the ALU 30.

However, before the comparison of number N with the first incremental number in the range of 0 to 1 is carried out, the product number X(N) is formed and stored in the second shift register 14. The X factor in this product number will be equal to the one of the stored numbers, $C_k$, corresponding to the center of the increment which has been selected for comparison with the tangent number N. In this instance, since incremental number $I_1$ has been selected first, the value of stored center number $C_1$ will equal X. The constant $C_1$, as seen in FIG. 2, is equal to 0.125 or ⅛. However, the product number $C_1(N)$ or (⅛)N can be formed without accessing $C_1$ from the ROM unit 24. This is accomplished by the digital shifter 32 interposed between the first shift register 12 and the second multiplexer 20.

Figure 3:
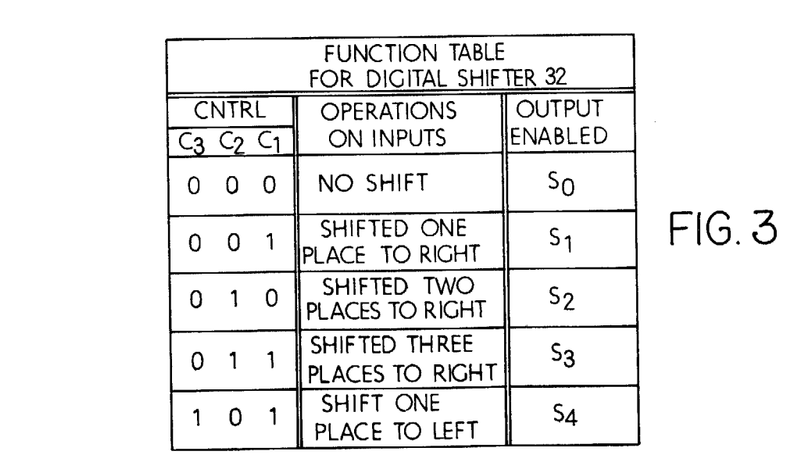
FIG. 3 is a table which sets forth the operations performed by the digital shifter of the hardware of FIG. 1 in accordance with particular signal states or levels on its control inputs.
Figure 4:
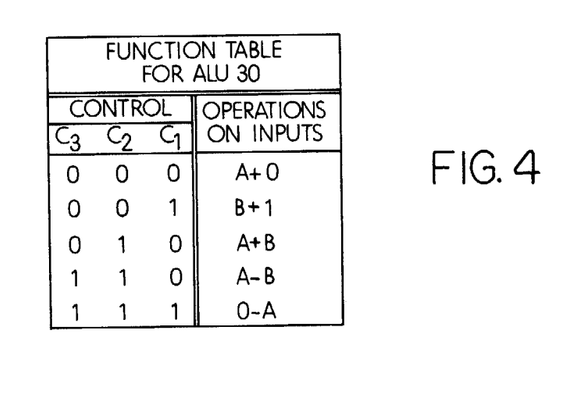
FIG. 4 is a table which sets forth the operations performed by the ALU of the hardware of FIG. 1 in accordance with particular signal levels on its control inputs.

As seen in FIG. 3, the binary state of the $C_3$, $C_2$ and $C_1$ control inputs to the digital shifter 32 determines whether, in which direction, and how much its output is shifted in relation to its input. Control input state 000 on respective $C_3$, $C_2$ and $C_1$ inputs of the shifter 32 causes no shift in the digits of the inputted number. Thus, the number is passed through to its $S_0$ output without change. Control input state 001 on shifter 32 causes a shift of all digits of the inputted number one place to the right (with the right-most or least significant bit disappearing) such that the number appears at its $S_1$ output divided by two. Control input state 010 on shifter 32 causes a shift of all digits of the inputted number two places to the right (with the two least significant bits disappearing) such that the number appears at its $S_2$ output divided by four. Control input state 011 on shifter 32 causes a shift of all digits of the inputted number three places to the right (with the three least significant bits disappearing) such that the number appears at its $S_3$ output divided by eight. Control input state 101 on shifter 32 causes a shift of all digits of the inputted number one place to the left (with the left-most or most significant bit disappearing) such that the number appears at its $S_4$ output multiplied by two.

Therefore, in order to form the product number $C_1(N)$ or (⅛)N, the timing control 28 via the control bus 34 causes both $C_2$ and $C_1$ control inputs to the digital shifter 32 to go to a high state such that the control input state is now 011, as seen in column (2) of FIG. 6, whereby the tangent number N being stored on the Q output of the first shift register 12 appears at the $S_3$ output of the shifter 32 shifted three places to the right (or divided by eight). The number N divided by eight is passed by the second multiplexer 20 from its 0 input and felt at the D input to the second shift register 14 after passing unchanged through the ALU 30 from its A input. Actually, the operation, A+O, was performed by the ALU 30 on the number (⅛)N felt on its A input in view that its control inputs $C_3$–$C_1$ were all low (000). As also seen in column (2) of FIG. 6, the number (⅛)N is clocked from the D input to and stored on the Q output of the second register 14 on the negative transition of a CK-2 pulse generated by the timing control 28 on the control bus 34 and received at the CK input to the register 14, with the negative transition occurring before the control inputs to the digital shifter 32 are returned to low states by the timing control 28.

After the product number $C_1(N)$, such being (⅛)N, is stored in the second register 14, comparison of the tangent number N with the selected incremental number $I_1$ is performed by the ALU 30. The selected incremental number $I_1$ is already present at the B input of ALU 30. After returning the $C_2$ and $C_1$ control inputs of the digital shifter 32 to low states, which places the tangent number N unchanged (no shift in its digits) on the $S_0$ output of the shifter 32 and on the A input of the ALU 30 after being passed through the second multiplexer 20 from its 0 input, the timing control 28 causes the $C_3$ and $C_2$ control inputs to the ALU 30 to go high, as seen in column (3) of FIG. 6. The control input state 110 on respective $C_3$, $C_2$ and $C_1$ inputs of the ALU 30 causes it to compare the numbers N and $I_1$ through performance of the operation A−B, or N−$I_1$. Since, in the example disclosed herein, N is equal to or greater than $I_1$, the $\overline{SN}$ (complement of the sign bit of the number on the E output of the ALU) output of the ALU 30 will remain high indicating that the subtraction operation resulted in a remainder at the E output of the ALU 30 which has a positive sign. This high state of the $\overline{SN}$ output of the ALU 30 is communicated to the timing control 28 on lead line 40. It is also communicated to the D input of the third shift register 16 but has no effect there in absence of the receipt of a clock pulse at its CK input.

The presence of a high state on the $\overline{SN}$ output of the ALU 30 following after the assertion of high states on the $C_3$ and $C_2$ control inputs to the ALU 30 by the timing control 28, which caused the A−B operation to take place, is interpreted by the timing control 28 as an indication to generate a CK-0 clock pulse to the counter 26, as shown in column (4) of FIG. 6. This causes the counter output to advance one count to (01) which places a high state on the $CO_1$ count input to the ROM unit 24. As a result, the input code to the ROM unit 24 is now 0001 which selects the next increment number $I_2$ for comparison with the number N. The number $I_2$ is felt at the enabled 0 input of the third multiplexer 22 and passed through to the B input of the ALU 30 in preparation for comparison with the tangent number N by the ALU 30.

However, again, before the comparison is carried out, a new product number $C_2(N)$ will be formed and stored in the second register 14 replacing the previous product number $C_1(N)$ currently stored therein. Like before, the new product number can be formed without the necessity of accessing number $C_2$ from the ROM unit 24. It will be noted that $C_2(N)$ will equal (⅜)N. The latter new product number can be readily arrived at by forming the product number (¼)N with the digital shifter 32 and then adding it to the previous product number (⅛)N currently stored in the second register.

Therefore, in order to form the product number (¼)N, the timing control 28 via the control bus 34 causes the $C_2$ control input to the digital shifter 32 to go to a high state such that the control input state is now 010, as seen in column (4) of FIG. 6, whereby the tangent number N being stored on the Q output of the first register 12 appears at the $S_2$ output of the shifter 32 shifted two places to the right (or divided by four). The number N divided by four is passed by the second multiplexer 20 from its 0 input to the A input of the ALU 30. At the same time, the timing control 28 raises the CNTRL input of the third multiplexer to a high state, enabling its 1 input and disabling its 0 input. This passes the previous product number $C_1(N)$ stored on the Q output of the second register 14 through the multiplexer 22 to the B input of the ALU 30. Concurrently with the above actions, the $C_2$ control input of the ALU 30 is changed to a high state by the timing control 28 which causes the operation, A+B, to be performed by the ALU 30, the sum of which, being (⅜)N, is outputted to the D input of the second register. The timing control 28 also generates on the clock bus 36 a second high clock pulse, CK-2, which is received at the CK input of the second register 14. The clock pulse CK-2 clocks the new product number ($\frac{3}{8}$)N from the D input to and stores it on the Q output of the second register 14 on the negative transition of the clock pulse, with the negative transition occurring before the control input $C_2$ of the digital shifter 32 is returned to a low state by the timing control 28. Thus, the product number ($\frac{3}{8}$)N stored in the second register 14 now corresponds to the product number $C_2(N)$, where $C_2$ is the center of the increment $I_2$ which has now been selected for comparison with the tangent number N.

The comparison of the second incremental number $I_2$ with the tangent number N is now performed by the ALU 30, as depicted in column (5) of FIG. 6. The timing control 28 returns the CNTRL input to the third multiplexer 22 to a low state which enables its 0 input and allows passage of the incremental number $I_2$ from the ROM unit 24 to the B input of the ALU 30. Also, the timing control 28 returns the $C_2$ control input of the digital shifter 32 to a low state which allows the tangent number N to appear, without change, at the A input of the ALU 30. The $C_3$ and $C_2$ control inputs of the ALU 30 are placed via control bus 34 in high states by the timing control 28. The control input state 110 of the ALU 30 causes it to compare the numbers N and $I_2$ through performance of the operation A−B, or N−$I_2$. Since, in the example disclosed herein, N is less than $I_2$, the $\overline{SN}$ output of the ALU 30 will go low indicating that the subtraction operation resulted in a remainder at the Z output of the ALU 30 which has a negative sign. This low state of the $\overline{SN}$ output of the ALU 30 is communicated to the timing control 28 on line 40.

The presence of a low state on the $\overline{SN}$ output of the ALU 30 following after the assertion of high states on the $C_3$ and $C_2$ control inputs to the ALU 30 by the timing control 28, which caused A−B operation to take place, is interpreted by the timing control 28 as an indication to move from the first stage to the second stage of operation of the implementation 10, as depicted in FIG. 7. The second stage of operation is initiated when the timing control 28 raises the $C_1$ control input of the ROM unit 24 to a high state in response to the low $\overline{SN}$ output of the ALU 30. As a result of the first stage of operation, the signal levels on the $CO_2$ and $CO_1$ count inputs to the ROM unit 24 are respectively low and high, reflecting the count of binary one (01) on the counter output. However, the $C_2$ and $C_1$ control inputs to the ROM unit 24 are now respectively low and high. Referring to FIG. 2, it is seen that with its control inputs in a binary one (01) state, the ROM unit 24 has its C output enabled. Additionally, with the count inputs of the ROM unit 24 in a binary one (01) state, the stored center number $C_2$ (0.375 in binary form) is selected and placed on its C output. Thus, the ROM input code 0101 selects center number $C_2$.

To summarize what has been accomplished by the first stage of operation of the implementation 10 in reference to the mathematical relationship, $$\text{Arctan}(N) = \text{Arctan}(C_k) + \frac{N - C_k}{1 + C_k(N)},$$

which is the same as expression (2) set forth hereinabove with the stored constants and the number N substituted for the variables, X and Y, it has been determined that the known number N is located in the second increment and therefore $C_k$ is equal to $C_2$. The control inputs to ROM unit 24 have now been set such that center number $C_2$ is enabled on its output. Also, the product, $C_k(N)$, which equals $C_2(N)$ has been formed and stored in the second register 14. Furthermore, the Arctan ($C_k$), which now is Arctan ($C_2$) and is equal to stored constant $A_2$, can readily be obtained, when needed, merely by making the $C_2$ control input of the ROM unit 24 go to a high state, while returning its $C_1$ control input to a low state.

SECOND STAGE OF OPERATION

In view of what has been accomplished in the first stage of operation of the implementation 10, as just described, the steps remaining to be carried out during the second stage of operation to arrive at the arctangent solution are as follows: form and store the dividend number, N−$C_2$; form and store the divisor number, 1+$C_2(N)$; then, therefrom, form and store the quotient number, $$(N-C_2)/[1+C_2(N)];$$

and, finally, access the stored arctangent number, $A_2$, and add it to the quotient number. The sum obtained in the final step is approximately equal to the arctangent of the known tangent number N.

Formation of the dividend number, N−$C_2$, is carried out in accordance with the timing relationships depicted in column (1) of FIG. 7. The tangent number N, stored on the Q output of the first register 12, is present on the A input of the ALU 30. This is because all of the control inputs to the digital shifter 32 are in a low state, as is the CNTRL input to the second multiplexer 20 (its 0 input is enabled). The center number, $C_2$, is present on the B input of the ALU 30, since the CNTRL input to the third multiplexer 22 is low which enables its 0 input. At this time, the timing control 28 raises the $C_3$ and $C_2$ inputs of the ALU 30 to high states, which causes the ALU 30 to perform an A−B operation, forming the dividend number N−$C_2$ on its E output. Also, the timing control 28 raises the CNTRL input to the first multiplexer 18 to a high state which enables its 1 input. Thus, the dividend number is felt on the D input to the first shift register 12. For storing the dividend number into the register 12, the timing control 28 generates a CK-1 clock pulse, as shown in column (1) of FIG. 7, which via clock bus 36 is received at the CK input of the register 12. On the negative transition of CK-1 pulse, the dividend number is clocked in and stored on the Q output of the first register 12. It should be pointed out that, now, the tangent number N is no longer stored in the implementation 10. Also, even though the dividend number is also being felt on the D input to the second shift register 14, it has no effect because that register is not clocked by the control 28 at this time.

In column (1) of FIG. 7, it will also be noted that when the dividend number was formed by the ALU 30, i.e., the operation A−B was carried out, the $\overline{SN}$ output of the ALU 30 went from low to high. This means that the dividend number is positive. If, instead, the dividend number has been negative, then the $\overline{SN}$ output would have remained low. Such a low $\overline{SN}$ output state would have been interpreted by the timing control 28 as an indication to change the control input states of the ALU 30 to all highs. The control input code 111, as seen in FIG. 4, would have caused the ALU to perform a O−A operation on the dividend number stored on the Q output of the register 12 and present at the A input of the ALU 30. This causes the 2's complement of the dividend to be produced on the E output of the ALU 30. It is then stored in the first register 12 on the negative transition of another CK-1 pulse generated by the timing control 28. Then, later, after the quotient number is formed as a result of the division operation, to be described hereafter, the control 28 would cause the ALU 30 to produce its 2's complement which would be added to the Arctan ($C_2$), or $A_2$, to arrive at the Arctan (N).

Formation of the divisor number, $1+C_2(N)$, is carried out in accordance with the timing relationships illustrated in column (2) of FIG. 7. The product number $C_2(N)$, stored on the Q output of the second register 14, is present on the 1 input to the third multiplexer 22. At this time, the timing control 28 raises the CNTRL input of the third multiplexer 22 to a high state, enabling its 1 input, which passes the product number $C_2(N)$ through to the B input of the ALU 30. Further, the timing control 28 at this time returns the $C_3$ and $C_2$ control inputs of the ALU 30 to a low state and raises its $C_1$ control input to a high state. This (001 on the control inputs of the ALU 30) causes the ALU 30 to perform a B+1 operation (adds a binary one to the product number), as shown in FIG. 4, which forms the divisor number $1+C_2(N)$ on its E output. For storing the divisor number into the register 14, the timing control 28 generates a CK2 clock pulse which via clock bus 36 is received at the CK input of the register 14. On the negative transition of CK-2 pulse, the divisor number is clocked in and stored on the Q output of the second register 14.

Since the CNTRL input to the third multiplexer 22 is held in a high state after the storing of the divisor number, $1+C_2(N)$, on the Q output of the second register 14, the divisor number is presented to the B input of the ALU 30. Also, with the $C_3$, $C_2$ and $C_1$ control inputs of the shifter 32 and the CNTRL input of the second multiplexer 20 held in low states by the control 28, the dividend number, $N-C_2$, stored on the Q output of the first register 12 is present on the A input of the ALU 30.

Now, the implementation 10 is ready to carry out the division of the dividend number, $N-C_2$, by the divisor number, $1+C_2(N)$. The division is performed in two general steps by the implementation 10. An overview of the division operation now follows, with the details thereof being explained thereafter in reference to FIGS. 1, 2 through 4 and 7.

During the first step, considering that the dividend will always be less than one and, thereby, less than the divisor, the dividend is repetitively shifted one place to the left until its most significant bit (MSB) in the units position is a binary one. (This is equivalent to shifting the divisor to the right relative to the dividend in normal division.) Each time that the dividend is shifted to the left one place, a partial quotient of binary zero is produced. Once the MSB of the shifted dividend number becomes a binary one, the second step is repetitively carried out, such being, a non-restoring type of divide operation. First, the divisor is subtracted from the shifted dividend. If the result or remainder after the first subtraction is a negative number (a binary one is produced at the sign bit location of the remainder), then, in the next following operation, the remainder is shifted one place to the left and the divisor is added to the shifted remainder. On the other hand, if the remainder had been a positive number (a binary zero is produced at the sign bit location of the remainder), then, in the next operation, the remainder is shifted one place to the left and the divisor is subtracted from the shifted remainder. Furthermore, in the case where the remainder is a negative number, a partial quotient of binary zero is produced. On the other hand, where the remainder is a positive number, a partial quotient of binary one is produced.

Columns (3) and (4) to (5) of FIG. 7 respectively illustrate exemplary portions of the operations performed in carrying out the two general steps of the division operation by the implementation 10. Since the respective operations carried out in both steps are repetitive in nature, a full understanding of the steps may be gained without complete illustration of all of the operations.

Referring back for the moment to the formation of the divisor, $1+C_2(N)$, it will be noted that this is the first number or result formed at the E output of the ALU 30 which is equal to or greater than one. As a result the most significant bit (MSB), excluding the sign bit, in the units position is a binary one. Also, in FIG. 1, it is seen that a lead line 42 connects the E output of the ALU 30 with the line 40 which, in turn, is connected to the timing control 28. Through this path, the timing control 28 monitors the MSB on the E output of the ALU 30. When the MSB output state from the ALU 30 goes high, as seen in column (2) of FIG. 7, upon the formation of the divisor, $1+C_2(N)$, the control 28 interprets this high state as an indication to initiate the division operation.

To initiate the first step of the division operation, the timing control 28 raises the $C_3$ and $C_1$ control inputs of the digital shifter 32 to a high level and places all control inputs of the ALU 30 at a low level. This causes the control input state of the shifter 32 to now be 101, as seen in column (3) of FIG. 7, which causes the dividend number, $N-C_2$, stored on the Q output of the first register 12 to appear at the $S_4$ output of the shifter 32 shifted one place to the left (or multiplied by two). The left shifted dividend number is passed by the second multiplexer 20 from its 0 input and felt at the A input of the ALU 30. With the control input state of the ALU 30 being 000, as seen in column (3) of FIG. 7, the ALU 30 performs an A+0 operation, which, in effect, passes the shifted dividend through unchanged to its E output. At this time, the level of the MSB of the left shifted divided will be monitored by the timing control 28 via lines 40 and 42. If the MSB signal level is still low this indicates to the timing control 28 that at least another left shift operation has to be performed on the dividend. First, the shifted dividend has to be stored in the first register 12. To accomplish this, the timing control 28 generates a CK-1 clock pulse which via clock bus 36 is received at the CK input of the register 14. On the negative transition of the CK-1 pulse, the shifted dividend is clocked in and stored on the Q output of the first register 12, as seen in column (3) of FIG. 7.

The above-described operations of the first division step are repeated until the MSB signal level goes high, as seen in column (3) of FIG. 7, which indicates to the timing control 28 that a binary one is now present at the units location of the shifted dividend number and, therefore, it is now time to move to the second step of the division operation. This occurs after the last left shifted state of the dividend number which has a MSB of binary one is stored in the first register 12 by the CK-1 clock pulse.

To initiate the second step of the divide operation, the timing control 28 returns all control inputs of the digital shifter 32 to a low level (000), which causes the last left shifted state of the dividend number, being stored on the Q output of the first register 12, to be placed unchanged on the A input of the ALU 30. At the same time, the timing control 28 raises the $C_3$ and $C_2$ control inputs of the ALU 30 to a high level. The control input code 110, as seen in FIG. 4, on the ALU 30 causes it to perform a A−B operation which comprises a subtraction of the divisor number on its B input from the shifted dividend number on its A input.

The result or remainder of the first subtraction present on the E output of the ALU 30 is felt on the D input of the first register 12 since the CNTRL input of the first multiplexer 18 is still high such that its 1 input is enabled. The timing control 28 generates a CK-1 clock pulse which stores the remainder on the Q output of the first register 12, as seen in column (4) of FIG. 7.

The timing control 28 also causes storing of the state of the $\overline{SN}$ output of the ALU 30 on the Q outut of the third register 16 by generating a CK-3 clock pulse, as seen in column (4) of FIG. 7, which via clock bus 36 is received at the CK input of the third register 16. It will be remembered that the contents of the third register 16 were cleared (all sixteen bits of the serial register made zeros) by a high RESET pulse generated by the timing control 28 and received at the RS input of the third register 16 at the commencement of the first stage of operation of the implementation 10. Thus, if the remainder of the first subtraction performed by the ALU 30 is a negative number (its sign bit a binary one), the $\overline{SN}$ output of the ALU 30 is low and there is no change in the contents of the third register 16 when it is clocked by the timing control 28. However, if the remainder had been a positive number (its sign bit a binary zero), the $\overline{SN}$ output would be high and a binary one would be inserted at the LSB position in the third register 16 when it is clocked by the timing control 28.

In each of the subsequent operations of the second step of the division operation, the remainder stored in the first register 12 from the preceding operation is shifted one place to the left before the divisor is either added to or subtracted from it. Therefore, as seen in column (5) of FIG. 7, the timing control 28 raises the $C_3$ and $C_1$ control inputs of the digital shifter 32 to a high level which places an input control code 101 on the shifter 32 and causes the stored remainder to appear on its $S_4$ output shifted one place to the left. The shifted remainder, in turn, passes through the second multiplexer 20 having its O input enabled and is felt at the A input of the ALU 30.

Whether the divisor will be added to or subtracted from the left shifted remainder during each of the subsequent operations depends on the level of the $\overline{SN}$ output of the ALU 30 at the completion of its previous operation. If the preceding remainder had been a negative number such that the $\overline{SN}$ output is low, the divisor will be added to the shifted remainder in the next succeeding operation of the ALU 30. On the other hand, if the preceding remainder had been a positive number such that the $\overline{SN}$ output is high, the divisor will be subtracted from the shifted remainder in the next succeeding operation of the ALU 30.

In column (4) of FIG. 7, it is seen that the $\overline{SN}$ output of the ALU 30 went low as a result of the first subtraction operation, indicating that the remainder which resulted was a negative number. Thus, the next succeeding operation will be an addition of the divisor to the shifted remainder. As seen in column (5) of FIG. 7, the timing control 28 returns the $C_3$ control input of the ALU 30 to a low level and leaves the $C_2$ control input at the high level which causes the ALU 30 to perform a A+B operation. Therefore, the divisor on its B input is added to the shifted remainder on its A input. The new remainder is clocked in and stored on the Q output of the first register 12, as before, by the negative transition of a CK-1 clock pulse generated by the timing control 28. Also, the $\overline{SN}$ output level is clocked in and stored on the Q output of the third register 16, as before, by the negative transition of a CK-3 clock pulse generated by the control 28. As seen in column (5) of FIG. 7, the level of the $\overline{SN}$ output was high after the addition indicating that the new remainder was a positive number. Thus, a binary one is stored at the LSB position of the third register 16 and the next operation performed by the ALU 30 will be A−B, or a subtraction of the divisor from the remainder stored in the first register 12 after the remainder has been shifted one place to the left by the digital shifter 32.

Each of the succeeding operations of the ALU 30 in the second division step are repetitively carried out contingent upon the $\overline{SN}$ output level resulting after each preceding operation of the ALU 30, as described above. Also, a partial quotient is stored in the third register 16 at the LSB location thereof, its value depending on the level of the $\overline{SN}$ output of the ALU 30. As each new partial quotient value is stored into the third register 16, the previously stored, serial string of partial quotient values are shifted toward the MSB location in the third register 16. Since the divisor and dividend are both sixteen bit numbers, the first and second steps of the division operation together will encompass sixteen operations to form the total quotient number. The number of left shift operations performed during the first step of the division operation to place a binary one at the MSB location in the shifted dividend will appear as a corresponding number of binary zeros serially located at the high (MSB) end of the third register 16. The number of partial quotient values clocked into the third register 16 during performance of the second step of the division operation will appear in serial locations from the lower end of the above-mentioned zeros to and including the lower (LSB) end of the third register 16.

A mathematical example of the above-described division operation performed by the implementation 10 during the second stage, where the tangent number, N, equal 0.43750, is as follows:

EXAMPLE OF SECOND STAGE DIVISION OPERATION $N = .4375$     $N - C_2 = .0625$
$C_2 = .375$     $1 + C_2N = 1.1640625$ $$\frac{N - C_2}{1 + C_2N} = \frac{0\ 0.0\,0\,0\,1\,0\,0\,0\,0\,0\,0\,0\,0\,0}{0\ 1.0\,0\,1\,0\,1\,0\,1\,0\,0\,0\,0\,0\,0\,0}$$

Sign bit is the leftmost 0; MSB is the next bit.

FIRST STEP: SHIFT DIVIDEND UNTIL MSB = 1

0 0.0 0 0 1 0 0 0 0 0 0 0 0 0     ↑↓ SHIFT     MSB = 0

(1) 0 0.0 0 1 0 0 0 0 0 0 0 0 0 0     ↑↓ LEFT ONE     0

(2) 0 0.0 1 0 0 0 0 0 0 0 0 0 0 0     ↑↓ PLACE EACH     0

(3) 0 0.1 0 0 0 0 0 0 0 0 0 0 0 0     ↑↓ TIME     0

(4) 0 1.0 0 0 0 0 0 0 0 0 0 0 0 0     ↑     1

SECOND STEP: NON-RESTORING DIVISION     $\overline{SN} = 0$ (5)     0|1.0 0 0 0 0 0 0 0 0 0 0 0 0 0
       − 0|1.0 0 1 0 1 0 1 0 0 0 0 0 0 0
          1|1.1 1 0 1 0 1 1 0 0 0 0 0 0 0     ↓ SHIFT LEFT ONE PLACE     1

(6)     1|1.1 0 1 0 1 1 0 0 0 0 0 0 0 0
       + 0|1.0 0 1 0 1 0 1 0 0 0 0 0 0 0
          0|0.1 1 0 1 0 1 1 0 0 0 0 0 0 0     ↓ SHIFT LEFT ONE PLACE     1

(7)     0|1.1 0 1 0 1 1 0 0 0 0 0 0 0 0
       − 0|1.0 0 1 0 1 0 1 0 0 0 0 0 0 0
          0|0.1 0 0 0 0 0 1 0 0 0 0 0 0 0     ↓ SHIFT LEFT ONE PLACE     0

(8)     0|1.0 0 0 0 0 1 0 0 0 0 0 0 0 0
       − 0|1.0 0 1 0 1 0 1 0 0 0 0 0 0 0
          1|1.1 1 0 1 1 0 1 0 0 0 0 0 0 0     ↓ SHIFT LEFT ONE PLACE     1

(9)     1|1.1 0 1 1 0 1 0 0 0 0 0 0 0 0
       + 0|1.0 0 1 0 1 0 1 0 0 0 0 0 0 0
          0|0.1 1 0 1 1 1 1 0 0 0 0 0 0 0     ↓ SHIFT LEFT ONE PLACE     1

(10)     0|1.1 0 1 1 1 1 0 0 0 0 0 0 0 0
        − 0|1.0 0 1 0 1 0 1 0 0 0 0 0 0 0
           0|0.1 0 0 1 0 0 1 0 0 0 0 0 0 0     ↓ SHIFT LEFT ONE PLACE     0

(11)     0|1.0 0 1 0 0 1 0 0 0 0 0 0 0 0
        − 0|1.0 0 1 0 1 0 1 0 0 0 0 0 0 0
           1|1.1 1 1 1 1 1 0 1 0 0 0 0 0 0     ↓ SHIFT LEFT ONE PLACE     1

(12)     1|1.1 1 1 1 0 1 0 0 0 0 0 0 0 0
        + 0|1.0 0 1 0 1 0 1 0 0 0 0 0 0 0
           0|1.0 0 0 1 1 1 1 0 0 0 0 0 0 0     ↓ SHIFT LEFT ONE PLACE     1

(13)     1|0.0 0 1 1 1 1 0 0 0 0 0 0 0 0
        − 0|1.0 0 1 0 1 0 1 0 0 0 0 0 0 0
           0|1.0 0 0 1 0 0 1 0 0 0 0 0 0 0     ↓ SHIFT LEFT -continued

EXAMPLE OF SECOND STAGE DIVISION OPERATION

```
(14)    1 |0.0 0 1 0 0 1 0 0 0 0 0 0 0 0          ↓ ONE PLACE
      - 0 |1.0 0 1 0 1 0 1 0 0 0 0 0 0 0          ←                1
        ─────────────────────────────
        0 |0.1 1 1 1 1 0 1 0 0 0 0 0 0 0          →

↓ SHIFT LEFT
                                                  ↓ ONE PLACE
(15)    0 |1.1 1 1 1 0 1 0 0 0 0 0 0 0 0          ←                0
      + 0 |1.0 0 1 0 1 0 1 0 0 0 0 0 0 0
        ─────────────────────────────
        1 |1.0 0 0 1 1 1 1 0 0 0 0 0 0 0
```

|  | FROM FIRST STEP | FROM SECOND STEP |
|---|---|---|
| QUOTIENT = 0 | 0.0 0 0 0 | 0 1 1 0 1 1 0 1 1 1 0 |

The final step in the second stage of operation of the implementation 10 is the addition of the quotient number, which is now stored in the third register 16, to the Arctan (C₂) which is stored in the ROM unit 24. As seen in column (6) of FIG. 7, the timing control 28 via control bus 34 raises the $C_2$ control input of the ROM unit 24 to high level and returns its $C_1$ control input to low level. As seen in FIG. 3, the control input code 1001 of the ROM unit 24 enables its A output and places the binary number representing arctangent number $A_2$, which corresponds to the arctangent of the center number $C_2$, on the O input of the third multiplexer 22. Also, as seen in column (6) of FIG. 7, the timing control 28 via control bus 34, at the same time, returns the CNTRL input of the third multiplexer 22 to a low level, which passes the arctangent number $A_2$ through to the B input of the ALU 30.

For passing the quotient number stored on the Q output of the third register 16 to the A input of the ALU 30, the timing control 28 via control bus 34 raises the CNTRL input of the second multiplexer 20 to a high level.

At the same time with the above actions, the timing control 28 places the $C_2$ control input of the ALU 30 at a high level which causes a A+B operation to be performed by the ALU 30. Thus, the sum of $A_2$ and the quotient number, which approximately equals the Arctangent (N), appears at the E output of the ALU 30 and is felt at the D input of the second register 14. On the negative transition of a CK-2 clock pulse, as seen in column (6) of FIG. 7, generated by the timing control 28 via clock bus 36 and received at the CK input of the register 14, the binary number representing the Arctangent (N) is clocked to the Q output of the second register 14 and is available to be used by other electronic equipment (not shown).

The solution of the Arctangent (N), or the angle in radians, of the known tangent number N is thereby, in the above-described manner, provided by a unique electronic digital hardware implementation, which functions at greater speed, with fewer computational steps and less memory than any apparatus or technique known heretofore.

Having thus described the invention, what is claimed is:

1. Electronic digital apparatus for computing an approximation of the arctangent of a given tangent number, N, being in the range of 0 to 1 and in binary form, comprising:

first electronic digital means storing in binary form (a) a first plurality ($2^n$) of tangent numbers, $I_1, I_2, I_j \ldots I_{2n}$, each representing one of a plurality ($2^n$) of equal increments in the range of 0 to 1, (b) a second plurality ($2^n$) of tangent numbers, $C_1, C_2, C_k \ldots C_{2n}$, each representing the center of a corresponding one of said increments, and (c) a third plurality ($2^n$) of numbers, $A_1, A_2, A_j \ldots A_{2n}$, each representing the arctangent of one of said second plurality of center numbers $C_k$, where $n = 1, 2, 3 \ldots$;

second electronic digital means operable in a first condition for receiving and storing in binary form the number N;

third electronic digital means operable in a first condition for receiving the number N from said second means and for successively receiving said increment number $I_j$ from said first means and comparing the same with said number N to determine in which one of said plurality of equal increments said number N is located;

fourth electronic digital means for receiving the number N from said second means and successively forming a product number, $C_k(N)$, for each center number corresponding to the increment number $I_j$ being compared to N;

fifth electronic digital means operable in a first condition for receiving and storing in binary form the product number $C_k(N)$;

transmission means for transmitting signals among said electronic digital means;

control means progressing through successive states during the computation of said approximation and operable in a first state for conditioning said second and third means to said first conditions and for enabling said transmission means to (a) transmit the number N from said second means to said third means, (b) simultaneously and successively transmit said increment numbers $I_j$ from said first means to said third means, (c) transmit the number N from said second means to said fourth means as each increment number $I_j$ is compared in said third means, (d) transmit a number $C_k$ from said first means to said fourth means as each increment number $I_j$ is compared in said third means and (e) transmit the product number $C_k(N)$ from said fourth means to said fifth means;

said third means, after said comparison determines in which one of said plurality of equal increments the number N is located, operable in a second condition for receiving said center number $C_k$ of the one of said increments in which said number N is located and for receiving again said number, N, to form a dividend number, $N-C_k$, from said received numbers;

said control means operable in a second state for conditioning said third means to a second condition and for enabling said transmission means to (a) transmit the center number $C_k$ of the one of said increments in which said number N is located from said first to said third means and (b) transmit the number N from said second to said third means;

said second means operable in a second condition for then receiving said dividend number, $N-C_k$, and storing the same in place of the number, N;

said third means operable in a third conditions for receiving said product number, $C_k(N)$, from said fifth means and adding one thereto to form a divisor number, $1+C_k(N)$;

said fifth means operable in a second condition for then receiving said divisor number, $1+C_k(N)$, and storing the same in place of said product number, $C_k(N)$;

said control means operable in a third state for conditioning said second and fifth means to said second condition and said third means to said third condition and for enabling said transmission means to (a) transmit said dividend number from said third means to replace the number N in said second means, (b) transmit said product number, $C_k(N)$, from said fifth means to said third means and (c) transmit the formed divisor number from said third means to said fifth means to replace therein the product number, $C_k(N)$;

said third means operable in a fourth condition then for receiving said dividend number, $N-C_k$, from said second means and said divisor number, $1+C_k(N)$, from said fifth means to form a quotient number, $(N-C_k)/[1+C_k(N)]$, therefrom;

sixth electronic digital means for receiving said quotient number from said third means and storing the same in binary form;

said control means operable in a fourth state for conditioning said third means to said fourth condition and for enabling said transmission means to transmit said quotient number from said third means to said sixth means;

said control means operable in a fifth state for conditioning said third means to a fifth state and for enabling said transmission means to (a) transmit a number, $A_i$, from said first means to said third means and (b) transmit said quotient number from said sixth means to said third means;

said third means operable in a fifth condition thereafter for receiving the number, $A_i$, from said first means which represents the arctangent of said one of said plurality of center numbers, $C_k$, used in forming the quotient number and for receiving said quotient number from said sixth means to form the sum thereof, $A_i+(N-C_k)/[1+C_k(N)]$, which approximately equals the arctangent of the known tangent number, N.

2. Electronic digital apparatus as recited in claim 1, wherein said first electronic digital storing means is a read-only-memory (ROM) unit.

3. Electronic digital apparatus as recited in claim 1, wherein said second, fifth and sixth electronic digital means are each respective shift registers.

4. Electronic digital apparatus as recited in claim 1, wherein said third electronic digital means is an arithmetic logic unit (ALU).

5. Electronic digital apparatus as recited in claim 1, wherein said fourth electronic digital means is a digital shifter.

* * * * *